United States Patent [19]

Zimmerman

[11] 4,375,115

[45] Mar. 1, 1983

[54] EXHAUST STACK CLEANING AND POLISHING IMPLEMENT

[76] Inventor: Robert W. Zimmerman, P.O. Box 843, Great Falls, Mont. 59403

[21] Appl. No.: 309,183

[22] Filed: Oct. 7, 1981

[51] Int. Cl.[3] .......................... A46B 15/00; B60S 3/04

[52] U.S. Cl. .................................. 15/160; 15/104.04; 15/144 R; 15/210 R

[58] Field of Search ..................... 15/104.04, 160, 162, 15/210 R, 210 B, 244 R, 244 A, 144 R

[56] References Cited

U.S. PATENT DOCUMENTS

| | | | |
|---|---|---|---|
| 1,766,870 | 6/1930 | Becker | 15/160 |
| 1,875,577 | 9/1932 | Endsley | 15/210 B X |
| 2,045,511 | 6/1936 | Babcock | 15/104.04 X |
| 2,850,754 | 9/1958 | Davis | 15/104.04 X |
| 3,365,740 | 1/1968 | Hunt et al. | 15/210 R |

FOREIGN PATENT DOCUMENTS

| | | | |
|---|---|---|---|
| 1171623 | 10/1958 | France | 15/210 R |
| 19790 | of 1903 | United Kingdom | 15/210 B |

*Primary Examiner*—Edward L. Roberts

*Attorney, Agent, or Firm*—D. Paul Weaver

[57] ABSTRACT

An arcuate somewhat resilient holder for a flexible polishing element is rotationally attached through a short radial arm to a descending elongated rigid handle set at an obtuse angle to a plane through the holder and arm. A user of the implement standing on the ground can conveniently polish the vertical exhaust stack of a diesel truck or tractor.

8 Claims, 5 Drawing Figures

FIG. 1
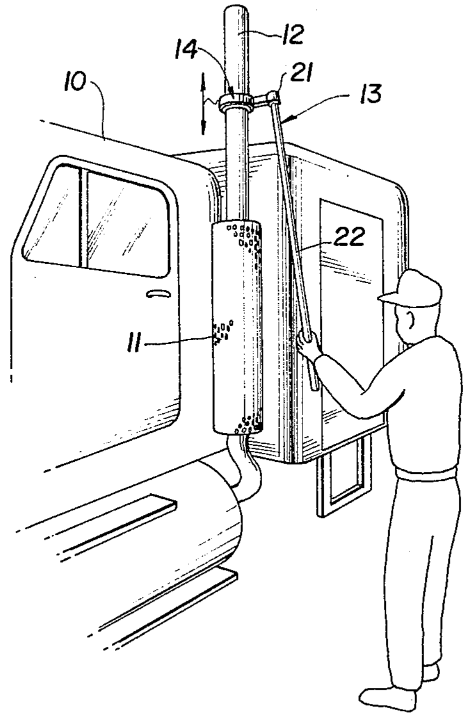
FIG. 2
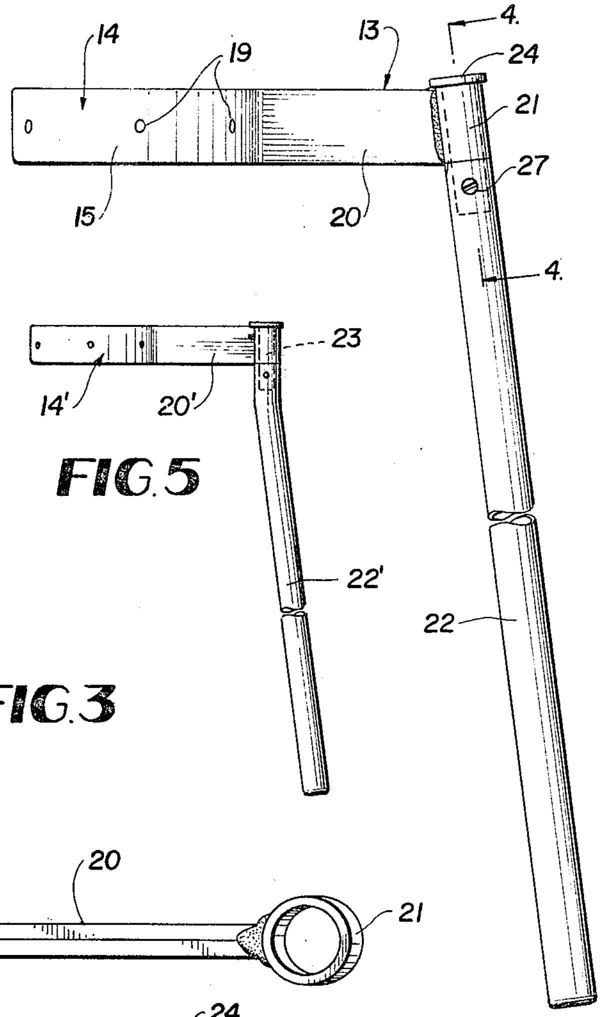
FIG. 5
FIG. 3
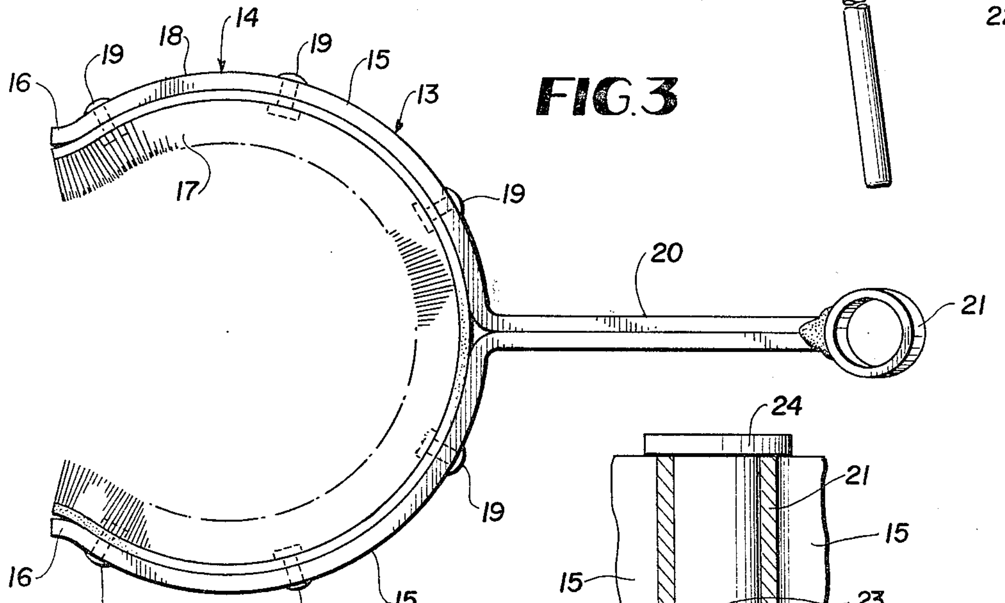
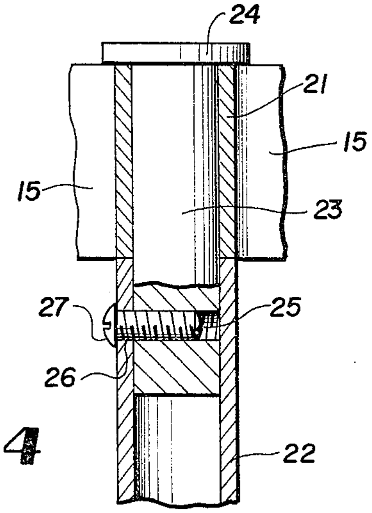
FIG. 4

EXHAUST STACK CLEANING AND POLISHING IMPLEMENT

BACKGROUND OF THE INVENTION

The object of the present invention is to satisfy a need for a convenient economical and durable device for cleaning and polishing the vertical exhaust stacks of trucks. Such stacks reach elevations of ten feet or more above the road and are difficult to clean and polish without using a ladder or other inconvenient methods.

While the prior art discloses various devices for wiping the exterior surfaces of pipes and tubes, no known device in the prior art is entirely suitable for the purposes of this invention, and hence there is a definite need for the invention. The implement is constructed for easy use while standing on the ground in the case of a truck without the need for any preliminary adjustment of parts since the geometry of the device renders its operation quite facile.

Other features and advantages of the invention will become apparent during the course of the following detailed description.

BRIEF DESCRIPTION OF THE DRAWINGS

FIG. 1 is a perspective view showing the invention in use.

FIG. 2 is a side elevation of the invention on an enlarged scale, partly broken away.

FIG. 3 is a plan view of the invention with parts omitted.

FIG. 4 is an enlarged fragmentary section taken on line 4—4 of FIG. 2.

FIG. 5 is a side elevation on a reduced scale showing an implement according to a modification of the invention.

DETAILED DESCRIPTION

Referring to the drawings in detail wherein like numerals designate like parts, the numeral 10 designates a truck having a vertical muffler 11 and attached exhaust stack 12 arranged near one side thereof to convey the exhaust products from the diesel engine well above the level of the roadway. The exhaust stack 12 can rise to a height of ten feet or more above the road and can measure four to five inches in external diameter.

Truck owners like to keep their equipment in a clean polished state for competitive reasons. The job of polishing the vertical stack 12 can be difficult and necessitates the use of a stepladder or some other awkward maneuver. To alleviate these difficulties, a cleaning and polishing implement 13 in accordance with the invention is provided.

The implement 13 comprises an arcuate body portion 14 formed in two opposing sections 15 of equal length which together span an arc of approximately 270°. The terminal portions 16 of the two opposing sections 15 are curved in a reverse direction to provide between them an entranceway for the exhaust stack 12. The two sections 15 form a holder for a flexible arcuate cleaning and polishing strip 17, such as a bristle brush, textile element, sheepskin or the like. A brush element is shown in FIG. 3 for the purpose of illustration. The brush bristles are appropriately set in a flexible backing strip 18 formed of plastics or other rubber-like material, which strip is attached by rivets 19 to the holder sections 15 at spaced intervals along the arc.

The arcuate sections 15 have a sufficient degree of resilience to enable the implement to be engaged by lateral movement with the exhaust stack 12. If desired, the implement can be engaged axially with the exhaust stack at its top.

The two arcuate sections 15 are joined integrally with a short rigid radial arm 20 at the rear side of the arcuate holder away from the terminals 16 and midway between them. The rear end of radial arm 20 has fixed thereto as by welding a short sleeve 21 whose axis is arranged at an obtuse angle to the plane occupied by the arm 13 of holder 14, preferably an angle of approximately 105°. This angle is important in rendering the implement convenient to use from a standing position at ground level, as shown in FIG. 1.

A straight elongated handle 22 for the implement in the form of an aluminum tubing section or the like approximately four feet long is coupled in end-to-end relationship with the short sleeve 21 by a bridging plug 23 received in the bores of the sleeve and handle. This plug has an enlarged head 24 at its upper end. Near its lower end, it contains a threaded cross aperture 25 adapted to register with a radial opening 26 of the handle near the top of the handle. The two openings receive a screw 27 to complete the joint between the handle and implement body. The construction provides a swiveled or rotational connection between the sleeve 21 and handle 22 so that the body portion 14 can rotate freely around the axis of the handle.

In accordance with a modified form of the invention, FIG. 5, the implement body portion 14' has its attached sleeve 21' arranged perpendicular to the plane occupied by the body portion 14'. The handle 22' of the implement is joined to the body portion 14' by the same bridging plug 23 previously described and the desired obtuse angle is imparted to the handle 22' by having it bent immediately below the bridging plug 23. As in the previous embodiment, the body portion 14' can rotate relative to the handle, which rotation in both embodiments facilitates the use of the implement for polishing the stack 12.

The implement as described, because of its geometry and sturdy construction, is very easy to use and is highly effective in cleaning the exhaust stack 12 of a truck or the like from a standing position. There are no moving parts on the implement which requre adjustment. At proper times, after long usage, the cleaning element 17-18 can be replaced by a new element. The advantages and utility of the device should be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A cleaning and polishing implement for truck exhaust stacks and the like comprising an arcuate body portion spanning an arc substantially greater than 180 degrees and having spaced terminals defining a passage leading into the body portion, a cleaning and polishing element attached to the interior of the body portion being substantially coextensive therewith, a short radial arm attached to the body portion at its side remote from said terminals and located midway between the terminals, a short sleeve fixed to the rear end of the radial arm across the axis of the arm, and an elongated handle having a rotational connection with said sleeve and depending from the sleeve and body portion and being disposed at an angle of slightly more than 90 degrees to the plane in which the body portion and radial arm are located.

2. A cleaning and polishing implement as defined in claim 1, and said angle being substantially 105 degrees.

3. A cleaning and polishing implement as defined in claim 1, and said arc being substantially 270 degrees.

4. A cleaning and polishing implement as defined in claim 1, and said arcuate body portion being somewhat resilient to enable application thereof to a vertical exhaust stack from one side of the latter.

5. A cleaning and polishing implement as defined in claim 4, and said cleaning and polishing element comprising a continuous flexible strip element, and plural circumferentially spaced fasteners attaching the strip element to said body portion.

6. A cleaning and polishing implement as defined in claim 1, and said sleeve and handle being coaxially arranged at said angle of slightly more than 90 degrees.

7. A cleaning and polishing implement as defined in claim 1, and said sleeve having its axis perpendicular to the plane occupied by the body portion and arm, and the handle being bent to said angle of slightly more than 90 degrees near said sleeve.

8. A cleaning and polishing implement as defined in claim 1, and said handle comprising a tube section in end-to-end relationship with said sleeve, a bridging plug engaging within the bores of said sleeve and tube section, and a fastener anchoring the bridging plug fixedly within the bore of the tube section and allowing the tube section and plug to rotate within the short sleeve.

* * * * *